United States Patent [19]

Hensel

[11] 4,118,862
[45] Oct. 10, 1978

[54] DIELECTRIC OPTICAL WAVEGUIDE SEVERING APPARATUS

[75] Inventor: Paul Christopher Hensel, Woodbridge, England

[73] Assignee: The Post Office, London, England

[21] Appl. No.: 815,508

[22] Filed: Jul. 14, 1977

[30] Foreign Application Priority Data

Aug. 13, 1976 [GB] United Kingdom .............. 33832/76

[51] Int. Cl.² ............................................ B26B 17/02
[52] U.S. Cl. ........................................ 30/124; 30/183
[58] Field of Search ................ 30/124, 134, 135, 241, 30/242, 180, 181, 183, 184, 185

[56] References Cited

U.S. PATENT DOCUMENTS

| 2,005,487 | 6/1935 | Zemanek | 30/241 X |
|---|---|---|---|
| 2,093,932 | 9/1937 | Schwalb | 30/185 |
| 2,714,250 | 8/1955 | Twedl | 30/180 |
| 3,173,205 | 3/1965 | Grehal | 30/134 |
| 3,755,894 | 9/1973 | Burdick | 30/185 X |
| 3,802,074 | 4/1974 | Hoppe | 30/134 |
| 4,034,473 | 7/1977 | May | 30/181 |

Primary Examiner—Jimmy C. Peters
Attorney, Agent, or Firm—William T. Estabrook; Solon B. Kemon

[57] ABSTRACT

A device for severing a dielectric optical waveguide comprising knife means, means for clamping a dielectric optical waveguide in closely spaced relationship with said knife means and an anvil which is movable towards said knife means. The anvil is so arranged and constructed that, in use, as it moves towards the knife means, it engages a dielectric optical waveguide clamped by said clamping means and urges it towards the knife means. When the waveguide comes into contact with the knife means it is under a given stress and has a predetermined configuration. The device also includes means for effecting movement of the anvil.

10 Claims, 8 Drawing Figures

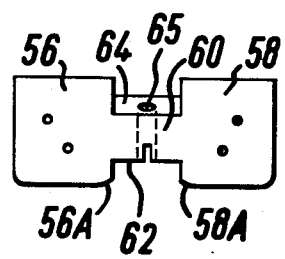
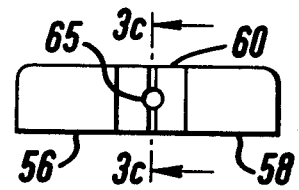
FIG.3a  FIG.3b
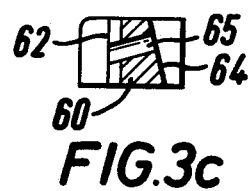
FIG.3c  FIG.3d
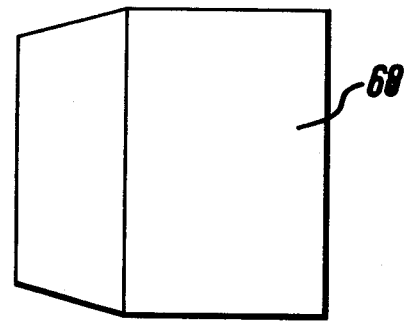
FIG.4a  FIG.4b

DIELECTRIC OPTICAL WAVEGUIDE SEVERING APPARATUS

This invention relates to dielectric optical waveguide severing apparatus.

Much research effort is being directed towards the development of dielectric optical waveguides for telecommunications purposes. It is important that such dielectric optical waveguides should have low loss characteristics. One area where loss of signal can occur is at a joint between successive waveguides. In order to produce a low loss dielectric optical waveguide joint it is necessary to cut or sever the optical waveguides to be joined so that the end of each optical waveguide is smooth and orientated at substantially 90° to the dielectric optical waveguide axis. Although this may not appear to be a difficult operation it has to be borne in mind that dielectric optical waveguides for use in telecommunications systems are made of glass and have very small diameters which are usually of the order of 100 microns or less. It will be seen therefore that the severing of a dielectric optical waveguide to produce an end having the above mentioned characteristics is an operation which requires special consideration. Furthermore, any device used for severing dielectric optical waveguides has to be suitable for use under field conditions.

It can be shown that the most suitable conditions for severing a dielectric optical waveguide to produce an end face which is smooth and perpendicular to the waveguide axis are achieved if the waveguide is held under a given tension and so that the region of the waveguide in which it is to be severed is curved with a radius of curvature of a few centimeters. If a small nick or incision is made in the surface of a waveguide held under these conditions then a crack immediately develops through the waveguide to produce the required end face. The present invention is concerned with a device for severing a dielectric optical waveguide under such conditions.

According to the present invention there is provided a device for severing a dielectric optical waveguide comprising knife means, means for clamping a dielectric optical waveguide in closely spaced relationship with said knife means, an anvil which is movable towards said knife means, the anvil being so arranged and constructed that, in use, as it moves towards the knife means, it engages a dielectric optical waveguide clamped by said clamping means and urges it towards the knife means, the arrangement being such that as the waveguide comes into contact with the knife means it is under a given stress and has a predetermined configuration, and means for effecting movement of the anvil.

The clamping means may be movable with said anvil. The clamping means may comprise at least one deformable pad which is arranged to clamp the waveguide against a fixed block which carries said knife means. Preferably the clamping means includes two rubber pads disposed one on each side of the anvil.

The surface of the anvil which is arranged to contact the dielectric optical waveguide may be curved.

The knife means may comprise a blade with a cutting edge which lies in a plane perpendicular to the axis of a waveguide which is to be severed.

The cutting edge of the blade may lie along a line which is inclined at an angle of 90° to the direction of movement of the anvil. The blade may be movable axially against bias means in a direction which makes a small acute angle with the direction of movement of the anvil.

The means for effecting movement of the anvil may comprise an actuating member which is operable to move said anvil in response to movement of a manually movable member. The manually movable member may comprise a body member which is pivotally mounted on another body member and is pivotal relative thereto against bias means.

The invention will be described now by way of example only with particular reference to the accompanying drawings. In the drawings:

FIGS. 3a to 3d show a fixing block of the severing device of FIG. 1, and

FIGS. 4a and 4b show a knife blade used in the severing device.

Figures 1, 2:
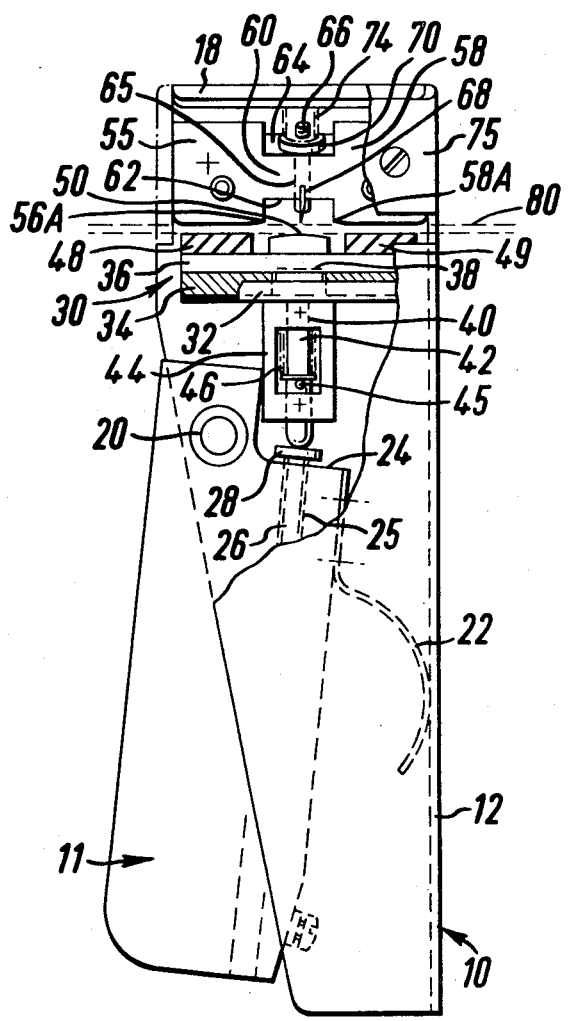
FIG. 1 is a side elevation partly in section of a dielectric optical waveguide severing device in accordance with the present invention.
FIG. 2 is a plan view of the severing device of FIG. 1.

The severing device shown in the drawings comprises two relatively pivotable body members 10 and 11. A first of the body members 10 is generally elongate and channel-shaped. The base 12 of the channel-shaped member is rectangular and the side walls 14, 15 are substantially trapezium shaped. One side wall 15 has a forwardly extending projection 16 formed integrally therewith the projection being bent around to form a front wall 18.

The second body member 11 is solid and of elongate form. The second body member 11 is pivotally mounted between the side walls of the channel-shaped member 10 by means of a dowel pin 20, the body member 11 being pivotable about the axis of the pin 20. The body member 11 carries a curved spring member 22 which sits against the base of the channel member 10 and normally maintains the axis of body member 11 at an acute angle to the axis of the channel member 10 as shown in FIG. 1. The body member 11 can be squeezed manually against the bias of spring 22 so that it moves into the space between the walls of the channel member 10. A forward portion of the second body member 11 adjacent the dowel pin 20 is cut away as shown at 24. An aperture 25 extends from the wall of the cut away portion 24 to the rear of the body member 11. The aperture 25 accommodates a screw 26 with a planar head 28 which is disposed externally of the aperture 25.

A clamping assembly 30 is disposed intermediate the forward edge portion of the walls 14 and 15 of the body member 10. The clamping assembly 30 has a channel member 32 which accommodates a magnetic strip 34. The strip 34 is fixed into the channel member 32 by means of adhesive. A pressure plate 36 is positioned against the magnetic strip 34 and held in position by magnetic attraction. The channel member 32, magnetic strip 34 and pressure plate 36 each have a central aperture, the axes of the apertures being aligned. The aperture in each of the pressure plate 36 and magnetic strip 34 is larger than the diameter of the aperture in the channel member 32. The larger diameter apertures accommodate the head 38 of an actuating member 40. The actuating member 40 has a stem 42 which extends from the head 38 through the aperture in the channel member 32, through a central bore in a fixing block 44 which is secured between the walls 14 and 15, and terminates against the head 28 of the screw 26. The stem 42 carries a pin 45 which serves as a reaction member for a spring 46 arranged coaxially with the stem 42. The spring 46 is arranged to urge the actuating member 40 towards the body member 11.

The pressure plate 36 has attached at opposite ends thereof two rubber pads 48, 49. An anvil 50 is attached to the plate 36 intermediate the pads 48, 49. The forward surface of the anvil 50 is curved with a carefully determined radius of curvature. The clamping assembly comprising the channel member 32, magnetic strip 34 and pressure plate 36 with its attachments is movable longitudinally between the side walls 14, 15 in response to movement of the actuating member 40 against the bias of the spring 46.

A block 55 is secured to the forwardly projecting portion 16 of the body member 10. The block 55 (see also FIGS. 3a to 3d) comprises two outer block portions 56, 58 which are of substantially square cross-section, and an intermediate bridging portion 60. The rearward faces of the block portions 56, 58 are arranged in closely spaced relationship with the rubber pads 48, 49. The edge portions of the rearward faces of the block portions 56, 58 adjacent their junction with the bridging portion 60 are rounded slightly at 56A and 58A. This is illustrated more clearly in FIG. 3d. The rearward face 62 of the bridging portion 60 is disposed perpendicular to the longitudinal axis of the body member 10, whilst the forward surface 64 is disposed in a plane which is inclined at substantially 75° to this axis. The bridging portion 60 has a through bore 65 the axis of which is inclined at an angle of 15° out of the plane of the paper relative to the longitudinal axis of the body member 10 (see also FIG. 3c). The bore 65 accommodates a threaded rod member 66. The rod 66 carries at its end adjacent the anvil 50 a knife blade 68. The shape of the knife blade 68 is shown in FIG. 4. A threaded ring 70 is screwed onto the rod and biassed away from the end face 18 by a spring 74. It will be noted that the cutting edge of the blade is located at an angle of substantially 90° to the axis of the body member 10 and parallel to the surface of the anvil. A cover 75 is attached to the body member 10 to enclose the block 55.

In use a dielectric optical waveguide 80 to be severed is located along the space between the block 55 and the rubber pads 48, 49 and anvil 50 so that its axis is perpendicular to the direction of movement of the anvil. The body portion 11 is then pivoted manually so that it moves towards the base of the channel member 10 against the bias of the spring 22. This results in the head 28 forcing the actuating member 40 forwardly along the channel member 10. The clamping assembly 30 thus moves towards the mounting block 55. As it does so the rubber pads 48, 49 clamp the optical waveguide against the rearward surfaces of the block portions 56 and 58 and the anvil 50 engages the waveguide intermediate the pads. The anvil 50 then moves forwardly relative to the rubber pads as they are compressed against the block 55. This causes the optical waveguide to be curved over the surface of the anvil and the waveguide is therefore tensioned. As the body member 11 continues to be moved into the channel member 10 the waveguide eventually contacts the cutting edge of the blade 68. The blade 68 is pushed towards the end wall 18 against the bias of the spring 74. Because the axis of rod 66 is inclined to the axis of the member 10 movement of the blade towards the wall 18 is accompanied by a sliding movement of the cutting edge of the blade over the surface of the waveguide. A small nick or incision is formed in the surface of the waveguide and once this nick has been formed a crack quickly develops through the waveguide and it is severed. The forward surface of the anvil 50 and the curved portions 56A and 58A of the rearward surfaces of the blocks 56 and 58 are accurately machined to accommodate the waveguide as it is tensioned by the anvil 50 so that at the moment of severing of the waveguide it is curved with the desired radius of curvature and has set up therein the appropriate stresses under which severing is to take place. The theoretical considerations which are used in determining the shape of the forward surface of the anvil 50 and of the curved portions 56A and 58A are given in a paper by Gloge et al, The Bell System Technical Journal Vol. 52 No. 9 Pages 1579 et seq November 1973.

When the body member 11 is released it is returned to its initial position by the spring 22. The actuating member 40 and clamping assembly 30 are returned to their initial position by the spring 46 and the blade 68 is returned to its initial position by the spring 74.

The position of the cutting edge of the blade 68 relative to the anvil 50 can be adjusted by adjustment of the position of the ring 70 on the rod 66.

I claim:

1. A device for severing a dielectric optical waveguide comprising knife means, means for clamping dielectric optical waveguide in closely spaced relationship with said knife means, an anvil which is movable towards said knife means, the anvil being so arranged and constructed that, in use, as it moves towards the knife means, it engages a dielectric optical waveguide clamped by said clamping means and urges it towards the knife means, the surface of the anvil which contacts said waveguide being curved and the arrangement being such that as the waveguide comes into contact with the knife means, it is under a given stress and has a predetermined configuration, and means for effecting movement of the anvil.

2. A device as claimed in claim 1, wherein said clamping means is movable with said anvil.

3. A device as claimed in claim 1, wherein said clamping means comprises at least one deformable pad which is arranged to clamp the waveguide against a fixed block which carries said knife means.

4. A device as claimed in claim 3, wherein the clamping means has two rubber pads disposed one on each side of the anvil.

5. A device as claimed in claim 1, wherein the knife means comprises a blade with a cutting edge which lies in a plane perpendicular to the axis of a waveguide which is to be severed.

6. A device as claimed in claim 5, wherein the cutting edge of the blade lies along a line which is inclined at an angle of 90° to the direction of movement of the anvil.

7. A device as claimed in claim 6, wherein the blade is movable axially against bias means in a direction which makes a small acute angle with the direction of movement of the anvil.

8. A device as claimed in claim 1, wherein the means for effecting movement of the anvil comprises an actuating member which is operable to move said anvil in response to movement of a manually movable member.

9. A device as claimed in claim 8, wherein said manually movable member comprises a body member which is pivotally mounted on another body member and is pivotal relative thereto against bias means.

10. A device as claimed in claim 8, wherein the manually movable member is operable to actuate said clamping means and to effect movement of the anvil the arrangement being such that initial movement of the manually movable member causes the clamping means to clamp a dielectric optical waveguide and further movement thereof causes the anvil to engage the waveguide.

* * * * *